(12) United States Patent
Derelöv et al.

(10) Patent No.: US 10,876,563 B2
(45) Date of Patent: *Dec. 29, 2020

(54) ASSEMBLED PRODUCT AND A METHOD OF ASSEMBLING THE PRODUCT

(71) Applicant: Valinge Innovation AB, Viken (SE)

(72) Inventors: Peter Derelöv, Helsingborg (SE); Hans Brännström, Höganäs (SE); Agne Pålsson, Hasslarp (SE)

(73) Assignee: VALINGE INNOVATION AB, Viken (SE)

( * ) Notice: Subject to any disclaimer, the term of this patent is extended or adjusted under 35 U.S.C. 154(b) by 484 days.

This patent is subject to a terminal disclaimer.

(21) Appl. No.: 15/646,714

(22) Filed: Jul. 11, 2017

(65) Prior Publication Data

US 2018/0087552 A1    Mar. 29, 2018

Related U.S. Application Data

(63) Continuation of application No. 14/158,165, filed on Jan. 17, 2014, now Pat. No. 9,726,210.

(30) Foreign Application Priority Data

Sep. 16, 2013 (SE) ........................ 1351060
Jan. 10, 2014 (SE) ........................ 1450018
(Continued)

(51) Int. Cl.
*F16B 12/46* (2006.01)
*A47B 47/04* (2006.01)
*F16B 12/12* (2006.01)

(52) U.S. Cl.
CPC ............ *F16B 12/46* (2013.01); *A47B 47/042* (2013.01); *F16B 12/125* (2013.01);
(Continued)

(58) Field of Classification Search
CPC ...... F16B 5/008; F16B 5/0012; F16B 5/0016; F16B 5/0024; F16B 12/12; F16B 12/125;
(Continued)

(56) References Cited

U.S. PATENT DOCUMENTS 291,032 A    1/1884   Cleland
634,581 A    10/1899  Miller
(Continued)

FOREIGN PATENT DOCUMENTS

CH    365 507 A    11/1962
CH    685 276 A5    5/1995
(Continued)

OTHER PUBLICATIONS

Extended European Search Report issued in EP Application No. 19157807.9, dated Apr. 12, 2019, European Patent Office, Munich, DE, 9 pages.
(Continued)

*Primary Examiner* — Jonathan P Masinick
(74) *Attorney, Agent, or Firm* — Buchanan Ingersoll & Rooney P.C.

(57) ABSTRACT

An assembled product, such as an assembled product, such as a furniture component or a furniture, such as a drawer, a cupboard, bookshelves, a wardrobe, a kitchen fixture, or a box for storing or transporting including at least three panels arranged in three different planes. Also, a set of panels for an assembled product and a method of assembling the product.

12 Claims, 11 Drawing Sheets

(30) Foreign Application Priority Data

Jan. 10, 2014 (SE) ........................................ 1450022
Jan. 15, 2014 (SE) ........................................ 1450034

(52) U.S. Cl.
CPC ... *F16B 2012/466* (2013.01); *Y10T 29/49826* (2015.01); *Y10T 403/7073* (2015.01)

(58) Field of Classification Search
CPC ................ F16B 12/26; E04F 15/02038; E04F 15/020056; E04F 15/02077; E04F 2201/0138; E04F 2201/0146; E04F 2201/0523; E04F 2201/0505; E04F 2201/0107; E04F 2201/0115; A47B 47/0066; A47B 47/0091
See application file for complete search history.

(56) References Cited

U.S. PATENT DOCUMENTS

| | | |
|---|---|---|
| 701,000 A | 5/1902 | Irens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,300,451 A | 10/1944 | Stone |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crovvder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Sauce |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |

(56) References Cited

U.S. PATENT DOCUMENTS

| | | | |
|---|---|---|---|
| 8,544,230 B2 | 10/2013 | Pervan | |
| 8,596,013 B2 | 12/2013 | Boo | |
| 8,602,227 B1 | 12/2013 | McDonald | |
| 8,615,952 B2 | 12/2013 | Engstrom | |
| 8,713,886 B2 | 5/2014 | Pervan | |
| 8,745,952 B2 | 6/2014 | Perra | |
| 8,764,137 B2 | 7/2014 | Fehre | |
| 8,776,473 B2 | 7/2014 | Pervan | |
| 8,833,028 B2 | 9/2014 | Whispell et al. | |
| 8,864,407 B1 | 10/2014 | Sorum | |
| 8,882,416 B2 | 11/2014 | Baur et al. | |
| 8,887,468 B2 | 11/2014 | Håkansson et al. | |
| 9,175,703 B2 | 11/2015 | Maertens | |
| 9,216,541 B2 | 12/2015 | Boo | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,700,157 B2 | 7/2017 | Keyvanloo | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,745,756 B2 | 8/2017 | Hannig | |
| 9,758,973 B2 | 9/2017 | Segaert | |
| 9,763,528 B2 | 9/2017 | Lung | |
| 9,809,983 B2 | 11/2017 | Trudel | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,378,570 B2 | 8/2019 | Broughton | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,830,266 B2 | 11/2020 | Fridlund | |
| 10,830,268 B2 | 11/2020 | Boo | |
| 2002/0170258 A1 | 11/2002 | Schwitte et al. | |
| 2004/0165946 A1 | 8/2004 | Areh et al. | |
| 2005/0042027 A1 | 2/2005 | Migli | |
| 2005/0236544 A1 | 10/2005 | Mancino | |
| 2005/0247653 A1 | 11/2005 | Brooks | |
| 2006/0091093 A1 | 5/2006 | Armari | |
| 2006/0101769 A1 | 5/2006 | Pervan et al. | |
| 2006/0180561 A1 | 8/2006 | Wisnoski et al. | |
| 2006/0236642 A1 | 10/2006 | Pervan | |
| 2006/0273085 A1 | 12/2006 | Casto | |
| 2007/0006543 A1 | 1/2007 | Engstrom | |
| 2007/0028547 A1 | 2/2007 | Grafenauer et al. | |
| 2008/0010937 A1 | 1/2008 | Pervan et al. | |
| 2008/0066415 A1 | 3/2008 | Pervan | |
| 2008/0193209 A1 | 8/2008 | Henderson | |
| 2008/0216435 A1 | 9/2008 | Nolan | |
| 2008/0236088 A1 | 10/2008 | Hannig et al. | |
| 2008/0244882 A1 | 10/2008 | Woxman et al. | |
| 2009/0014401 A1 | 1/2009 | Tallman | |
| 2009/0064624 A1 | 3/2009 | Sokol | |
| 2010/0028592 A1 | 2/2010 | Barkdoll et al. | |
| 2010/0083603 A1 | 4/2010 | Goodwin | |
| 2010/0104354 A1 | 4/2010 | Spalding | |
| 2010/0173122 A1 | 7/2010 | Susnjara | |
| 2010/0289389 A1 | 11/2010 | Crabtree, II | |
| 2011/0023303 A1 | 2/2011 | Pervan et al. | |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0009383 A1 | 1/2012 | Hardesty | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 | 7/2012 | Perra et al. | |
| 2012/0279161 A1 | 11/2012 | Håkansson et al. | |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2013/0287484 A1 | 10/2013 | Phillips | |
| 2014/0013919 A1 | 1/2014 | Gerke et al. | |
| 2014/0055018 A1 | 2/2014 | Shein et al. | |
| 2014/0111076 A1 | 4/2014 | Devos | |
| 2014/0286701 A1 | 9/2014 | Sauer | |
| 2014/0294498 A1 | 10/2014 | Logan | |
| 2015/0034522 A1 | 2/2015 | Itou et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0230600 A1 | 8/2015 | Schulte | |
| 2015/0368896 A1 | 12/2015 | Schulte | |
| 2016/0000220 A1 | 1/2016 | Devos | |
| 2016/0007751 A1 | 1/2016 | Derelöv | |
| 2016/0145029 A1 | 5/2016 | Ranade et al. | |
| 2016/0174704 A1 | 6/2016 | Boo et al. | |
| 2016/0186925 A1 | 6/2016 | Bettin | |
| 2016/0192775 A1 | 7/2016 | Andersson | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0283430 A1 | 10/2018 | Leistert | |
| 2018/0328396 A1 | 11/2018 | Fransson et al. | |
| 2019/0113061 A1 | 4/2019 | Håkansson et al. | |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |

FOREIGN PATENT DOCUMENTS

| | | |
|---|---|---|
| CH | 696 889 A5 | 1/2008 |
| CH | 698988 B1 | 12/2009 |
| CH | 705 082 A2 | 12/2012 |
| CN | 101099618 A | 1/2008 |
| CN | 102917616 A | 2/2013 |
| CN | 203424576 U | 2/2014 |
| DE | 1107910 B | 5/1961 |
| DE | 24 14 104 A1 | 10/1975 |

(56) References Cited

FOREIGN PATENT DOCUMENTS

| | | |
|---|---|---|
| DE | 25 14 357 A1 | 10/1975 |
| DE | 26 35 237 A | 2/1978 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2008 011 589 U1 | 11/2008 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 0 935 076 A1 | 8/1999 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2009/136195 A1 | 11/2009 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/187533 A1 | 11/2016 |
| WO | WO 2017/131574 A1 | 8/2017 |
| WO | WO 2018/004435 A1 | 1/2018 |
| WO | WO 2018/080387 A1 | 5/2018 |

OTHER PUBLICATIONS

U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/228,975, Niclas Håkansson and Darko Pervan, filed Dec. 21, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 16/220,574, Derelöv.
U.S. Appl. No. 16/220,585, Derelöv.
U.S. Appl. No. 16/228,975, Håkansson et al.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
Derelöv, Peter, U.S. Appl. No. 16/220,574 entitled "Set of Panels," filed in the U.S. Patent and Trademark Office filed Dec. 14, 2018.
Derelöv, Peter, U.S. Appl. No. 16/220,585 entitled "Set of Panels," filed in the U.S. Patent and Trademark Office filed Dec. 14, 2018.
Håkansson, Niclas, et al., U.S. Appl. No. 16/228,975 entitled "Mechanical Locking System for Building Panels," filed in the U.S. Patent and Trademark Office filed Dec. 21, 2018.

(56) References Cited

OTHER PUBLICATIONS

Derelöv, Peter, et al., U.S. Appl. No. 16/361,609 entitled "Panels Comprising a Mechanical Locking Device and an Assembled Product Comprising the Panels," filed in the U.S. Patent and Trademark Office filed Mar. 22, 2019.
Boo, Christian, U.S. Appl. No. 16/386,732 entitled "Set of Panels With a Mechanical Locking Device," filed in the U.S. Patent and Trademark Office filed Apr. 17, 2019.
Boo, Christian, U.S. Appl. No. 16/386,810 entitled "Set of Panels With a Mechanical Locking Device," filed in the U.S. Patent and Trademark Office filed Apr. 17, 2019.
Boo, Christian, U.S. Appl. No. 16/386,824 entitled "Set of Panels With a Mechanical Locking Device," filed in the U.S. Patent and Trademark Office filed Apr. 17, 2019.
Derelöv, Peter, U.S. Appl. No. 16/386,874 entitled "Symmetric Tongue and T-Cross," filed in the U.S. Patent and Trademark Office filed Apr. 17, 2019.
U.S. Appl. No. 14/486,681, Hans Brännström, Agne Pålsson and Peter Derelöv, filed Sep. 15, 2014, (Cited herein as US Patent Application Publication No. 2015/0078807 A1 of Mar. 19, 2015).
U.S. Appl. No. 14/573,572, Christian Boo, filed Dec. 17, 2014, (Cited herein as US Patent Application Publication No. 2015/0198191 A1 of Jul. 16, 2015.
U.S. Appl. No. 15/271,622, Peter Derelöv and Mats Nilsson, filed Sep. 21, 2016, (Cited herein as US Patent Application Publication No. 2017/0079433 A1 of Mar. 23, 2017.
U.S. Appl. No. 15/308,872, Darko Pervan, filed Nov. 4, 2016, (Cited herein as US Patent Application Publication No. 2017/0089379 A1 of Mar. 30, 2017.
U.S. Appl. No. 15/379,791, Niclas Håkansson and Darko Pervan, filed Dec. 15, 2016, (Cited herein as US Patent Application Publication No. 2017/0097033 A1 of Apr. 6, 2017.
U.S. Appl. No. 15/415,356, Peter Derelöv and Christian Boo, filed Jan. 25, 2017, (Cited herein as US Patent Application Publication No. 2017/0208938 A1 of Jul. 27, 2017.
U.S. Appl. No. 15/422,798, Magnus Fridlund, filed Feb. 2, 2017, (Cited herein as US Patent Application Publication No. 2017/0227035 A1 of Aug. 10, 2017.
U.S. Appl. No. 15/428,469, Magnus Fridlund, filed Feb. 9, 2017, (Cited herein as US Patent Application Publication No. 2017/0227032 A1 of Aug. 10, 2017.
U.S. Appl. No. 15/428,504, Christian Boo, filed Feb. 9, 2017, (Cited herein as US Patent Application Publication No. 2017/0227031 A1 of Aug. 10, 2017.
U.S. Appl. No. 15/432,190, Magnus Fridlund, filed Feb. 14, 2017, (Cited herein as US Patent Application Publication No. 2017/0234346 A1 of Aug. 17, 2017.
U.S. Appl. No. 15/642,757, Peter Derelöv, filed Jul. 6, 2017, (Cited herein as US Patent Application Publication No. 2017/0298973 A1 of Oct. 19, 2017.
U.S. Appl. No. 15/562,254, Peter Derelöv, filed Sep. 27, 2017, (Cited herein as US Patent Application Publication No. 2018/0080488 A1 of Mar. 22, 2018.
U.S. Appl. No. 15/567,507, Christian Boo, Peter Derelöv and Agne Pålsson, filed Oct. 18, 2017, (Cited herein as US Patent Application Publication No. 2018/0112695 A1 of Apr. 26, 2018.
U.S. Appl. No. 15/794,491, Peter Derelöv, filed Oct. 26, 2017, (Cited herein as US Patent Application Publication No. 2018/0119717 A1 of May 3, 2018.
U.S. Appl. No. 15/923,701, Peter Derelöv, filed Mar. 16, 2018.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/027,479, Christian Boo and Peter Derelöv, filed Jul. 5, 2018.
U.S. Appl. No. 15/923,701, Derelöv.
U.S. Appl. No. 15/956,949, Derelöv.
U.S. Appl. No. 15/978,630, Fransson, et al.
U.S. Appl. No. 16/027,479, Boo, et al.

International Search Report dated Apr. 29, 2015 in PCT/SE2014/051523, ISA/SE, Patent-och registreringsverket, Stockholm, SE, 4 pages.
Extended European Search Report issued in EP Application No. 14878329.3, dated Aug. 25, 2017, Eurpean Patent Office, Munich, DE, 7 pages.
Derelov, Peter, U.S. Appl. No. 15/923,701 entitled "Panels Comprising a Mechanical Locking Device and an Assembled Product Comprising the Panels", filed in the U.S. Patent and Trademark Office filed Mar. 16, 2018.
Derelöv, Peter, U.S. Appl. No. 15/956,949 entitled "Panels for an Assembled Product", filed in the U.S. Patent and Trademark Office filed Apr. 19, 2018.
Fransson, Jonas, et al., U.S. Appl. No. 15/978,630 entitled "Elements and a Locking Device for an Assembled Product," filed in the U.S. Patent and Trademark Officefiled May 14, 2018.
Boo, Christian, et al., U.S. Appl. No. 16/027,479 entitled "Panels Comprising a Mechanical Locking Device and an Assembled Product Comprising the Panels," filed in the U.S. Patent and Trademark Office filed Jul. 5, 2018.
U.S. Appl. No. 16/553,325, Peter Derelöv and Johan Svensson, filed Aug. 28, 2019.
U.S. Appl. No. 16/553,350, Peter Derelöv and Johan Svensson, filed Aug. 28, 2019.
U.S. Appl. No. 16/564,438, Hans Brännström, Agne Pålsson and Peter Derelöv, filed Sep. 9, 2019.
U.S. Appl. No. 16/567,436, Peter Derelöv and Mats Nilsson, filed Sep. 11, 2019.
U.S. Appl. No. 16/663,603, Magnus Fridlund, filed Oct. 25, 2019.
U.S. Appl. No. 16/697,335, Christian Boo and Peter Derelöv, filed Nov. 27, 2019.
U.S. Appl. No. 16/553,325, Derelöv et al.
U.S. Appl. No. 16/553,350, Derelöv et al.
U.S. Appl. No. 16/564,438, Brännström et al.
U.S. Appl. No. 16/567,436, Derelöv.
U.S. Appl. No. 16/663,603, Fridlund.
U.S. Appl. No. 16/697,335, Boo et al.
Derelöv, Peter, U.S. Appl. No. 16/553,325 entitled "Set of Panels with a Mechanical Locking Device," filed in the U.S. Patent and Trademark Office filed Aug. 28, 2019.
Derelöv, Peter, U.S. Appl. No. 16/553,350 entitled "Set of Panels with a Mechanical Locking Device," filed in the U.S. Patent and Trademark Office filed Aug. 28, 2019.
Brännström, Hans, et al., U.S. Appl. No. 16/564,438 entitled "Assembled Product and a Method of Assembling the Assembled Product," filed in the U.S. Patent and Trademark Office filed Sep. 9, 2019.
Derelöv, Peter, U.S. Appl. No. 16/567,436 entitled "Panels Comprising a Mechanical Locking Device and an Assembled Product Comprising the Panels," filed in the U.S. Patent and Trademark Office filed Sep. 11, 2019.
Fridlund, Magnus, U.S. Appl. No. 16/663,603 entitled "Element and Method for Providing Dismantling Groove," filed in the U.S. Patent and Trademark Office filed Oct. 25, 2019.
Boo, Christian, et al., U.S. Appl. No. 16/697,335 entitled "Panels Comprising a Mechanical Locking Device and an Assembled Product Comprising the Panels," filed in the U.S. Patent and Trademark Office filed Nov. 27, 2019.
U.S. Appl. No. 16/703,077, Magnus Fridlund, filed Dec. 4, 2019, (Cited herein as US Patent Application Publication No. 2020/0102978 A1 of Apr. 2, 2020).
U.S. Appl. No. 16/722,096, Peter Derelöv and Christian Boo, filed Dec. 20, 2019.
U.S. Appl. No. 16/722,096, Derelöv et al.
Derelöv, Peter, et al., U.S. Appl. No. 16/722,096 entitled "Panels Comprising a Mechanical Locking Device and an Assembled Product Comprising the Panels," filed in the U.S. Patent and Trademark Office filed Dec. 20, 2019.
U.S. Appl. No. 16/861,639, Peter Derelöv, filed Apr. 29, 2020.
U.S. Appl. No. 16/861,639, Derelöv.
Derelöv, Peter, U.S. Appl. No. 16/861,639 entitled "Panels Comprising a Mechanical Locking Device and an Assembled Product Comprising the Panels," filed in the U.S. Patent and Trademark Office filed Apr. 29, 2020.

(56) References Cited

OTHER PUBLICATIONS

Pervan, Darko, U.S. Appl. No. 16/946,047 entitled "Mechanical Locking System for Building Panels," filed in the U.S. Patent and Trademark Office dated Jun. 4, 2020.
Brännström, Hans, et al., U.S. Appl. No. 16/915,258 entitled "Assembled Product and Method of Assembling the Assembled Product," filed in the U.S. Patent and Trademark Office dated Jun. 29, 2020.
U.S. Appl. No. 16/946,047.
U.S. Appl. No. 16/915,258.
Håkansson, Niclas, et al., U.S. Appl. No. 16/951,394 entitled "Mechanical Locking System for Building Panels," filed in the U.S. Patent and Trademark Office dated Nov. 18, 2020.
U.S. Appl. No. 16/951,394.

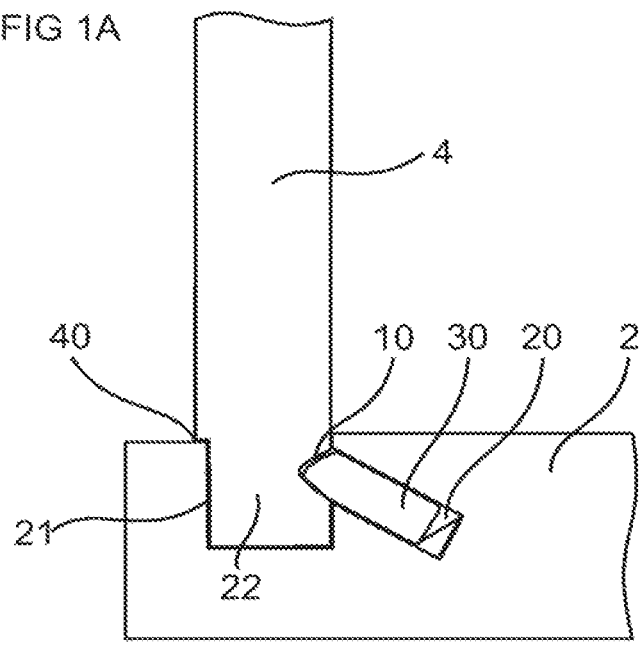
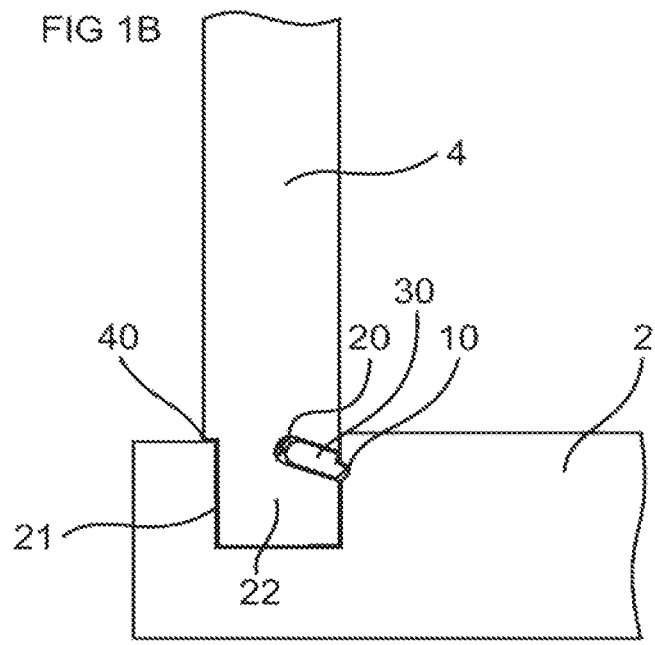

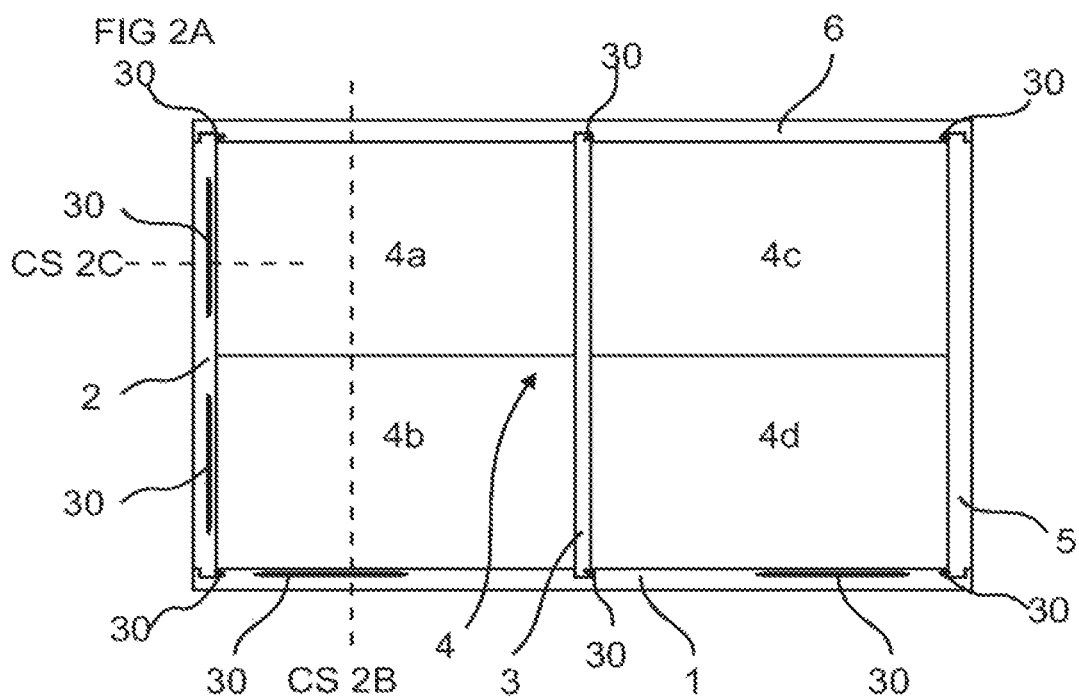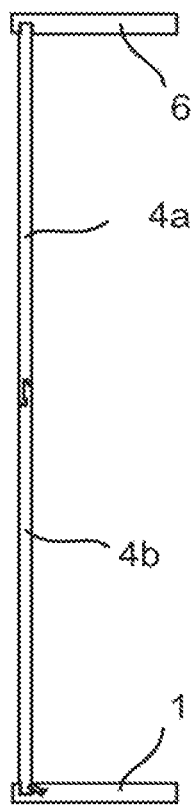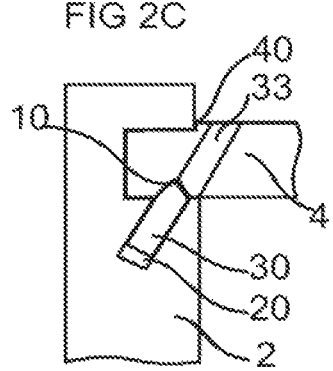

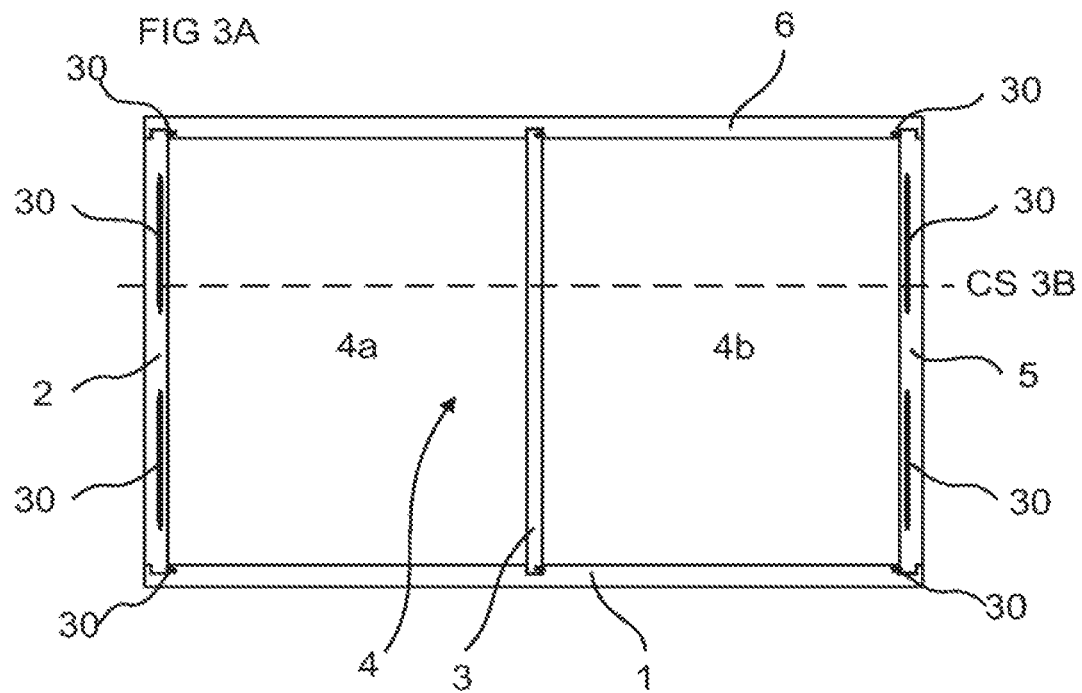
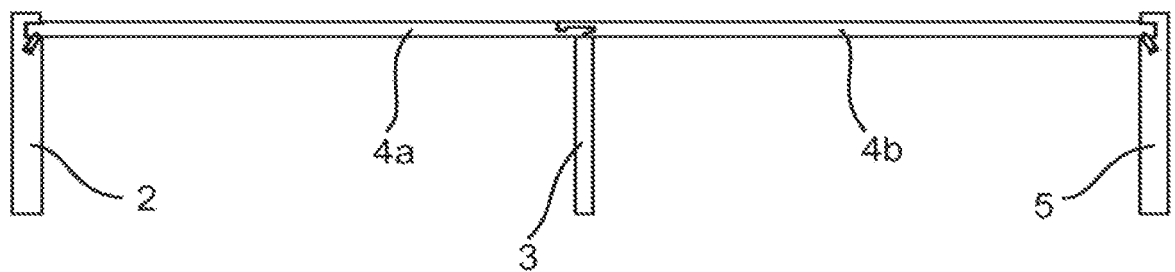

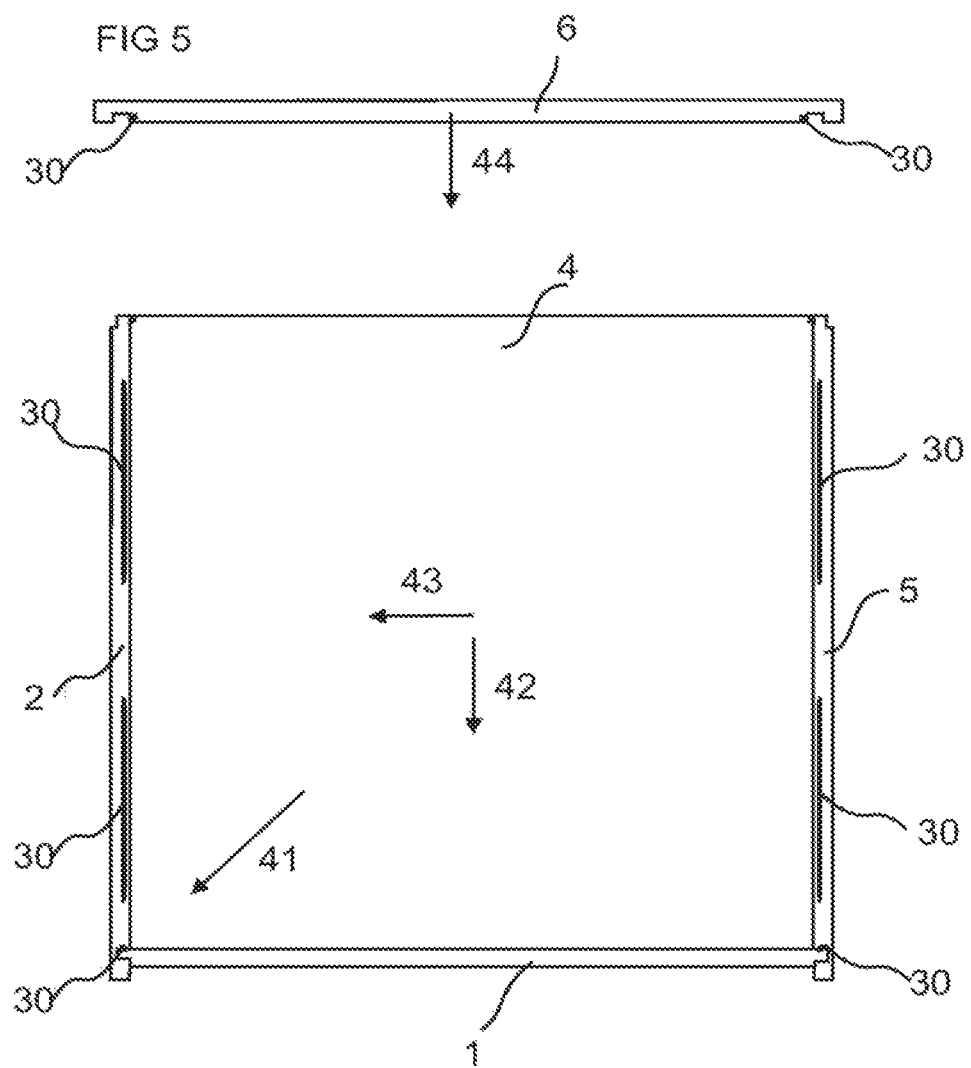

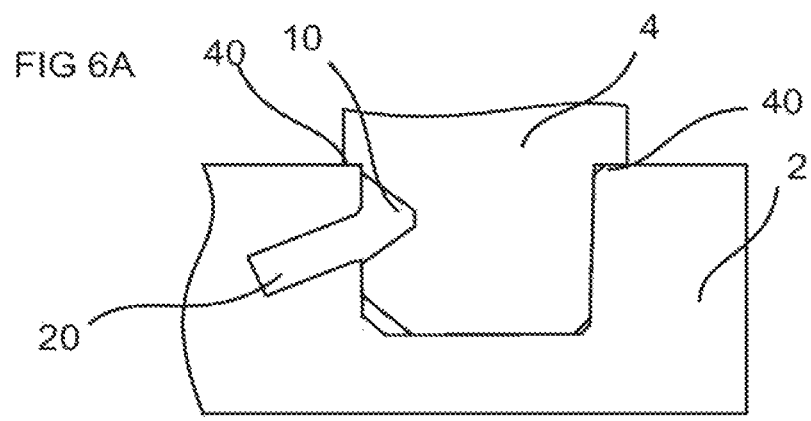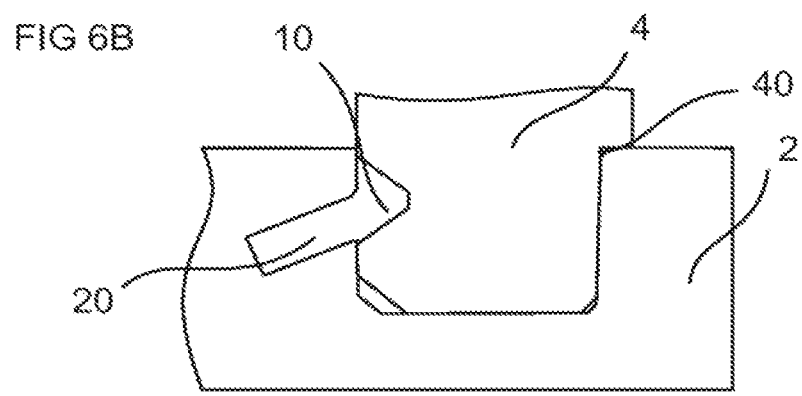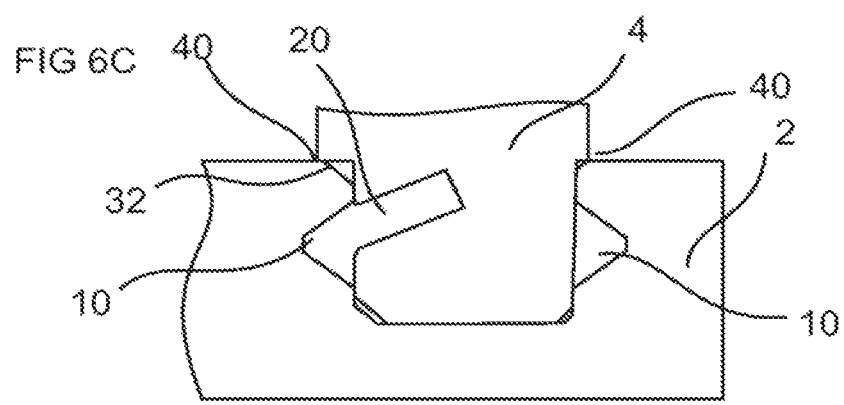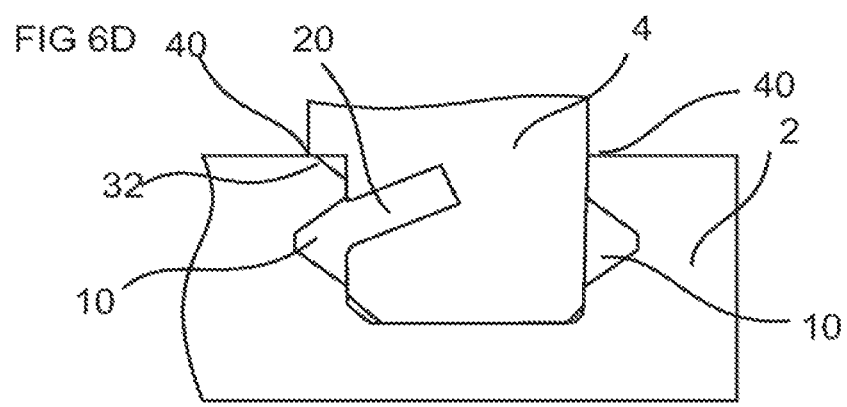

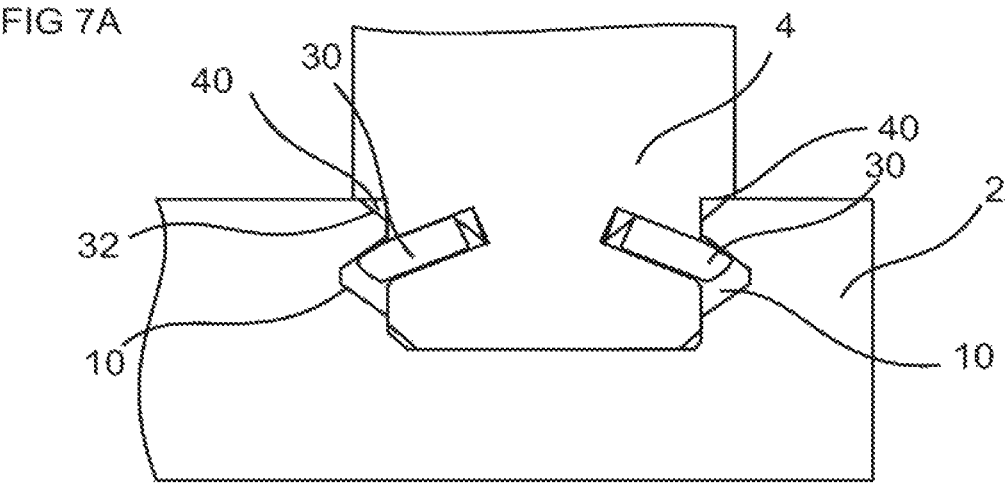
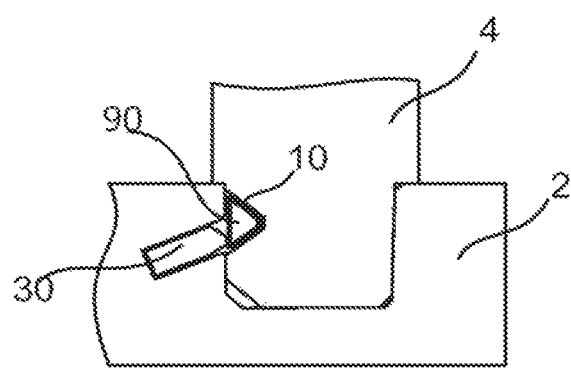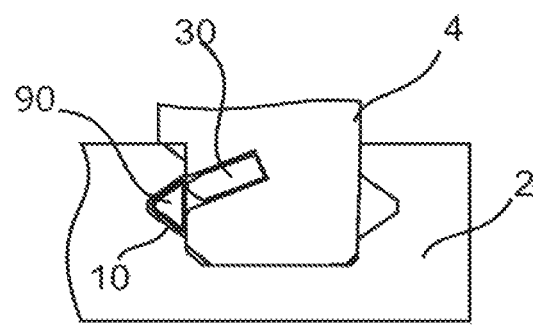
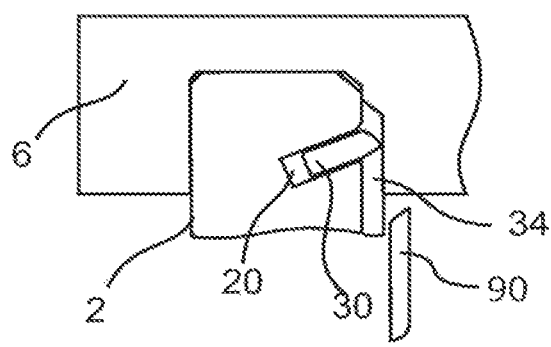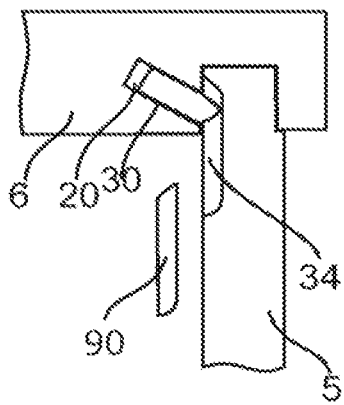

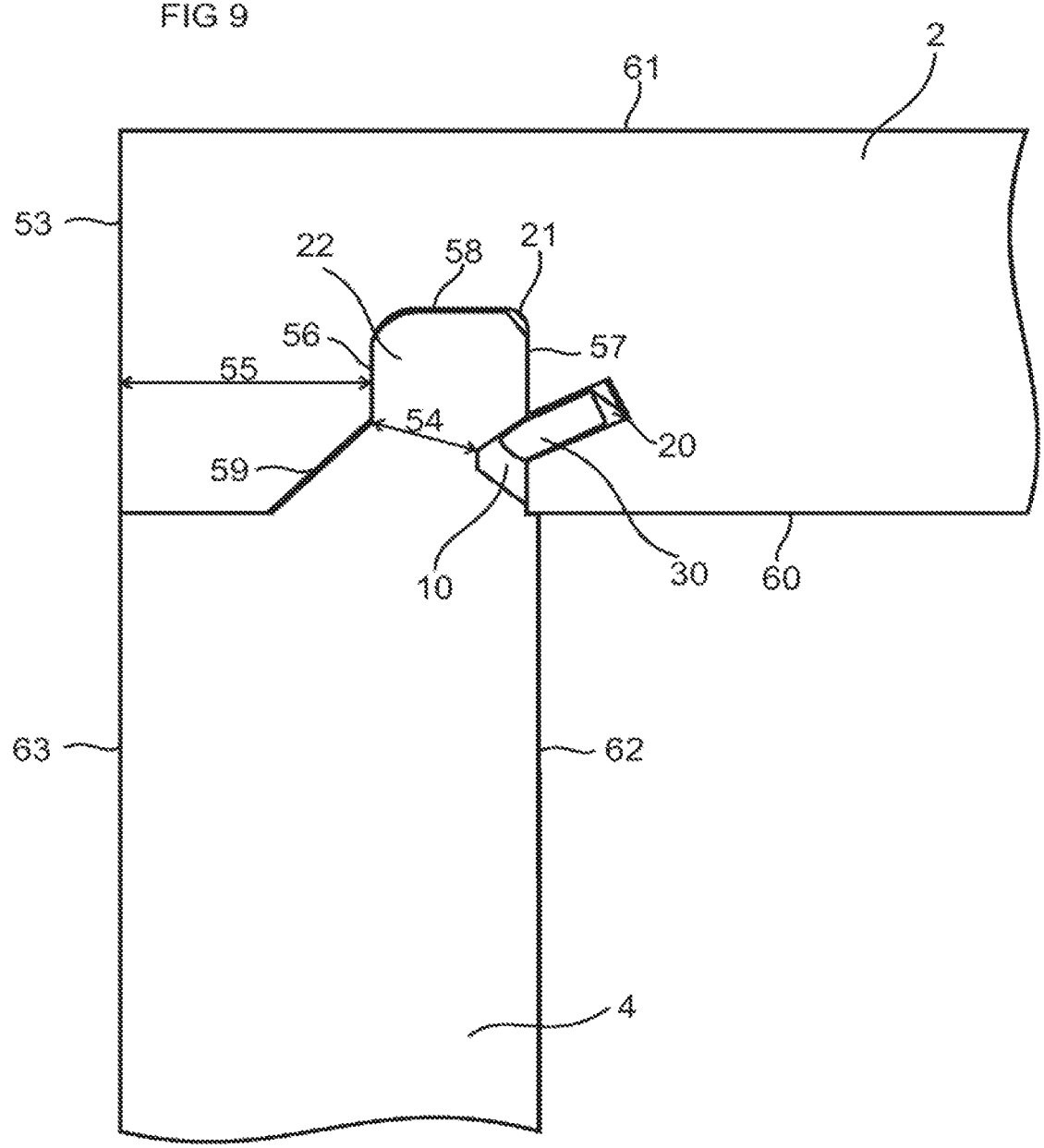

ASSEMBLED PRODUCT AND A METHOD OF ASSEMBLING THE PRODUCT

CROSS REFERENCE TO RELATED APPLICATIONS

The present application is a continuation of U.S. application Ser. No. 14/158,165, filed on Jan. 17, 2014, which claims the benefit of Swedish Application No. 1450034-2, filed on Jan. 15, 2014, Swedish Application No. 1450018-5, filed on Jan. 10, 2014, Swedish Application No. 1450022-7, filed on Jan. 1510 2014, and Swedish Application No. 1351060-7, filed on Sep. 16, 2013. The entire contents of each of U.S. application Ser. No. 14/158,165, Swedish Application No. 1450034-2, Swedish Application No. 1450018-5, Swedish Application No. 1450022-7, and Swedish Application No. 1351060-7 are hereby incorporated herein by reference in their entirety.

TECHNICAL FIELD

The present disclosure relates to an assembled product, such as a box or a drawer, a furniture component or a furniture, and a method of assembling the product. The assembled product is provided with a locking device comprising a flexible tongue.

TECHNICAL BACKGROUND

A furniture provided with a mechanical locking system is known in, e.g., WO 2012/154113 (A1). The furniture comprises a first panel connected perpendicular to a second panel by a mechanical locking system comprising a flexible tongue in an insertion groove.

SUMMARY

It is an object of certain embodiments of the present disclosure to provide an improvement over the above described techniques and known art. A specific objective is to improve the method for assembling a furniture product.

A further object of embodiments of the disclosure is to provide a set of panels for an assembled product, such as a so-called flat-pack furniture product, that are configured to be assembled without tools and a method of assembling the product.

At least some of these and other objects and advantages that will be apparent from the description have been achieved by a set of panels for an assembled product. The set of panels are provided with one or more locking devices. Each locking device comprises a flexible tongue arranged in an insertion groove at an edge of a panel, said flexible tongue cooperates with a tongue groove, at an adjacent edge of an adjacent panel, for locking the panel and the adjacent panel together. The locking device is configured such that the edge and the adjacent edge may be connected by hand. The set of panels comprises at least four frame panels that are configured to be connected together at adjacent edges by at least one of said locking devices to obtain a frame, preferably of a rectangular shape. The set of panels comprises a fifth panel, such as a back or bottom panel, which is configured to be connected to a back or bottom edge of the frame by at least one of said locking devices.

The fifth panel is preferably configured be connected to a back or a bottom edge of two of the frame panels, by at least one of said locking devices at each of said back or bottom edge.

The locking devices may comprise an edge section groove at the panel or at the adjacent panel. An edge section of the other of the panel or the adjacent panel may cooperate with said edge groove for locking the panel and the adjacent panel together. The flexible tongue and the tongue groove cooperate for locking the panel and the adjacent panel together in a first direction and the edge section and the edge section groove cooperate for locking the panel and the adjacent panel together in a second direction, perpendicular to the first direction.

The edge section may be provided with a calibrating groove.

The panels may be of plastic or wood fiber. For example, the panels may be plastic panels or wood fibre based boards, e.g. HDF boards, particleboard or solid wood board. The panels may be provided with a decorative layer.

The assembled product may be a furniture component or a furniture, such as a drawer, a cupboard, bookshelves, a wardrobe, a kitchen fixture, or a box for storing or transporting.

The insertion groove, of at least one of said locking devices, may extend along essentially the entire length of the edge of the panel (e.g., at least 80% of the length of the panel).

The tongue groove, of at least one of said locking devices, may extend along essentially the entire length of the adjacent edge of the adjacent panel (e.g., at least 80% of the length of the adjacent panel).

A tongue groove and an insertion groove that extend along essentially the entire width of the panel and the adjacent panel (e.g., at least 80% of the width of the adjacent panel), respectively, may facilitate the production of the tongue groove and the insertion groove. The tongue groove and the insertion groove may be produced by displacing the panel and the adjacent panel, respectively, pass a mechanical cutting tool, such as a fixed milling head.

Any of the panels may be provide with a dismantling groove at any of the locking devices, said dismantling groove or recess is preferably adapted for insertion of a dismantling tool. The dismantling tool may be inserted into the dismantling groove or recess to un-lock the locking device.

A second aspect of the disclosure is a method of assembling a set of panels to obtain an assembled product, the method comprising:

arranging a first panel, with a first main plane, perpendicular to a second panel with a second main plane, wherein the first main plane is perpendicular to the second main plane;

connecting by hand a first edge of the first panel to a first edge of the second panel, by linearly displacing the first panel and/or the second panel;

arranging a third panel, with a third main plane, perpendicular to the first and the second panel, wherein the third main plane is perpendicular to the first and the second main plane; and connecting by hand a second edge of the third panel to a second edge of the second panel, by linearly displacing the third panel and/or second panel.

The method may further comprise the step of connecting by hand a first edge of the third panel to a second edge of the first panel, by linearly displacing the third panel and/or the first panel.

The method may further comprise the steps of arranging a fourth panel, with a fourth main plane, perpendicular to the first and the third panel, wherein the fourth main plane is parallel to the second main plane, and connecting by hand a first edge of a fourth panel to a third edge of the first panel, by linearly displacing the fourth panel and/or the first panel.

The method may further comprise the step of connecting by hand a third edge of the third panel to a second edge of the fourth panel, by linearly displacing the third panel and/or the fourth panel.

The method may further comprise the steps of arranging a fifth panel, with a fifth main plane, perpendicular to the third and the fourth panel, wherein the fifth main plane is parallel to the first main plane, and connecting by hand a first edge of the fifth panel to a third edge of the second panel, and a third edge of a fifth panel to a third edge of the fourth panel, by linearly displacing the fifth panel and/or the second and the fourth panel.

The set of panels may comprise at least five panels, wherein each connecting step comprises linearly displacing of one of the five panels.

The set of panels under the second aspect may comprise embodiments of the locking device described for use with the first aspect.

Each linear displacement may be executed in a direction parallel to the third main plane.

Each connecting step may comprise a displacement of a part of a flexible tongue of a locking device, wherein a part of the flexible tongue is displaced into a tongue groove for locking an edge to an adjacent edge.

Each connecting step may comprise connecting two panels such that the mechanically locked together in directions perpendicular to the main plane of each of the two connected panels.

The panels may be of plastic or wood fiber. For example, the panels may be wood fibre based boards, e.g. HDF boards, particleboard or solid wood board, or plastic panels. The panels may be provided with a decorative layer.

The assembled product may be a furniture component or a furniture, such as a drawer, a cupboard, bookshelves, a wardrobe, a kitchen fixture, or a box for storing or transporting.

A third aspect of the disclosure is an assembled product comprising at least three panels arranged in three different planes, a first panel is connected essentially perpendicular to a second panel, and a third panel is connected essentially perpendicular to the second panel. The assembled product comprises one or more locking devices, each comprising a flexible tongue arranged in an insertion groove at a panel, said flexible tongue cooperates with a tongue groove, at an adjacent panel, for locking the panel and the adjacent panel together. The second edge of the second panel is connected to a second edge of the third panel by a first of said locking devices.

The panels may be of plastic or wood fiber. For example, the panels may be wood fibre based boards, e.g. HDF boards, particleboard or solid wood board, or plastic panels. The panels may be provided with a decorative layer.

The assembled product may be a furniture component or a furniture, such as a drawer, a cupboard, bookshelves, a wardrobe, a kitchen fixture, or a box for storing or transporting.

The three planes are preferably essentially perpendicular planes.

A first edge of the third panel may be connected to a first edge of the first panel by a second of said locking devices. The first panel and the second panel may be a first and a second board, respectively, of a frame, and the third panel may be the back piece, of a bookshelves or a wardrobe. The third panel, such as a back piece, connected by the first and the second of said locking devices, may increase the strength of the assembled product. The angle between first and the second panel may be guided by the angle between the first and the second edge of the third panel. A bookshelves or a wardrobe with perpendicular corners may be obtained easily by embodiments of the disclosure. The first edge of the third panel may be connected slideable along the first edge of the first panel in order to simplify assembling and disassembling.

A first edge of a sixth panel may be connected essentially perpendicular to the first panel, between the second and fourth panel. The sixth panel may be essentially parallel to the second and fourth panel. The first edge of the sixth panel may be connected by a seventh of said locking devices. The flexible tongue of the seventh of said locking devices is preferably arranged in an insertion groove at the first edge of the sixth panel. The sixth panel may be a fixed shelf of the assembled product, e.g. a bookshelves.

A fourth panel may be connected essentially perpendicular to the first panel, wherein a third edge of the third panel may be connected to a second edge of the fourth panel by a third of said locking devices.

The second and the fourth panel may be arranged essentially parallel and the third panel may be connected slideable to the second and the fourth panel in order to facilitate disassembling.

A fourth edge of the third panel may be arranged in a groove at a second edge of a fifth panel. The fifth panel may be connected essentially perpendicular to the second and fourth panel.

The assembled product may be a semi product for a drawer, without the fifth panel that may be a front panel, and the first, second and fourth panels may be boards of the frame and the third panel may be the bottom board. The front panel may be connected essentially perpendicular to the second and fourth panel in the same factory as the semi product, in another factory or carpentry or by a carpenter at a construction site.

A first edge of the fifth panel may be connected to a third edge of the second panel by a fourth of said locking devices, and a third edge of the fifth panel may be connected to a third edge of the fourth panel by a fifth of said locking devices.

A first edge of the first panel may be connected to a first edge of the second panel by a sixth of said locking devices.

A first edge of a fourth panel may be connected to a third edge of the first panels by a seventh of said locking devices.

The insertion groove, in at least one of said locking devices, may extend along essentially the entire length of the panel (e.g., at least 80% of the length of the panel).

The tongue groove, in at least one of said locking devices, may extend along essentially the entire length of the adjacent panel (e.g., at least 80% of the length of the adjacent panel).

A tongue groove and an insertion groove that extend along essentially the entire width of the panel and the adjacent panel (e.g., at least 80% of the width of the adjacent panel), respectively, may facilitate the production of the tongue groove and the insertion groove. The tongue groove and the insertion groove may be produced by displacing the panel and the adjacent panel, respectively, pass a fixed milling head.

The flexible tongue, in at least one of said locking devices, may be displaceable in the insertion groove during locking and un-locking of the locking device.

The locking devices may comprise an edge section groove at the panel or at the adjacent panel. An edge section of the other of the panel or the adjacent panel may cooperate with said edge groove for locking the panel and the adjacent panel together. The flexible tongue and the tongue groove cooperate for locking the panel and the adjacent panel together in a first direction and the edge section and the edge section groove cooperate for locking the panel and the adjacent panel together in a second direction, perpendicular to the first direction.

The edge section may be provided with a calibrating groove.

The third panel may be provided with a dismantling groove or recess at one or more of said locking devices, said dismantling groove or recess is preferably adapted for insertion of a dismantling tool. The dismantling tool may be inserted into the dismantling groove or recess to un-lock the locking device.

Any of the first, the second, the fourth or the fifth panel may be provide with a dismantling groove at any of the locking devices, said dismantling groove or recess is preferably adapted for insertion of a dismantling tool. The dismantling tool may be inserted into the dismantling groove or recess to un-lock the locking device.

BRIEF DESCRIPTION OF THE DRAWINGS

The present disclosure will by way of example be described in more detail with reference to the appended schematic drawings, which shows embodiments of the present disclosure.

FIGS. 1A-B show embodiments of a locking device for a furniture according to embodiments of the disclosure.

FIGS. 2A-C show a furniture component or a furniture according to embodiments of the disclosure.

FIGS. 3A-B show a furniture component or a furniture according to an embodiment of the disclosure.

FIG. 5 shows a partly assembled furniture or furniture component according to an embodiment of the disclosure.

FIGS. 6A-D show embodiments of a locking device for a furniture according to embodiments of the disclosure.

FIG. 7A shows an embodiment of a locking device for a furniture according to an embodiment of the disclosure.

FIG. 7B-C show embodiments of a locking device for a furniture and a disassembling tool according to embodiments of the disclosure.

FIGS. 7D-E show embodiments of a locking device provided with a disassembling recess and a disassembling tool.

FIG. 9 shows a locking device for an assembled product according to an embodiment of the disclosure.

DETAILED DESCRIPTION

Figure 4A:
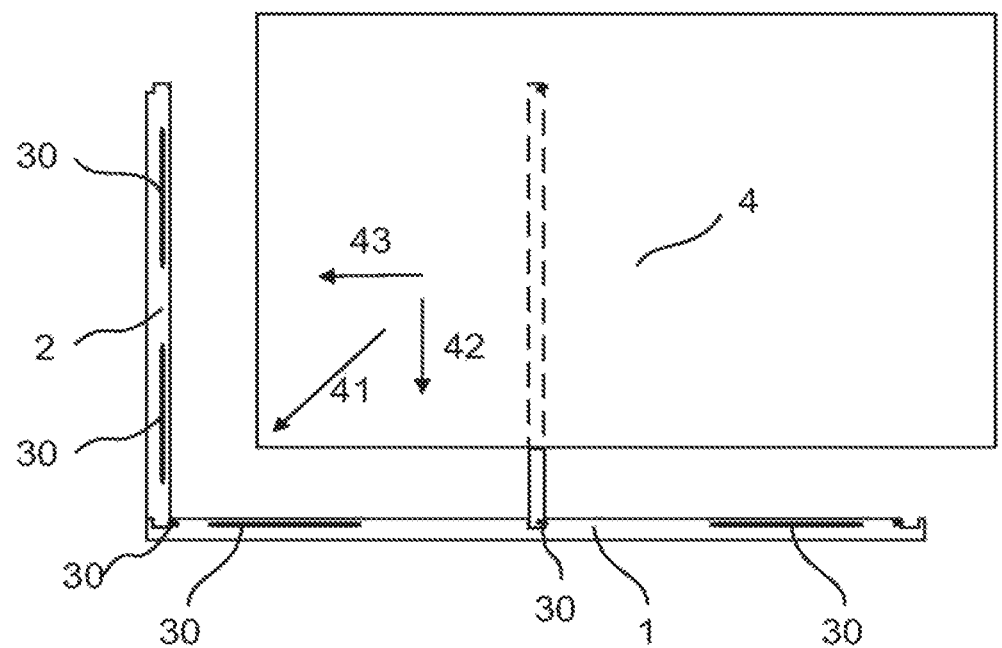
FIG. 4A shows a method of assembling a furniture component or a furniture according to an embodiment of the disclosure.

An embodiment of a locking device for locking a panel 4 to an adjacent panel 2 is shown in FIGS. 1A-B. The panel and the adjacent panel may be panels of a furniture that are connected perpendicular to each other, i.e. with a main surface of the panel perpendicular to a main surface of the adjacent panel. An edge section 22 of the panel 4 is arranged in an edge section groove 21 of the adjacent panel 2 for locking the panel and the adjacent panel together in a first direction. The embodiment in FIG. 1A comprises a flexible tongue 30 arranged in an insertion groove 20 in the edge section groove 21 and a tongue groove 10 at the edge section 22. The embodiment in FIG. 1B comprises a flexible tongue 30 arranged in an insertion groove 20 at the edge section 22 and a tongue groove in the edge section groove. The flexible tongue 30 and the tongue groove 10 cooperate for locking the panel and the adjacent panel together in a second direction, which is essentially perpendicular to the first direction. The flexible tongue is during assembling, of the panel and the adjacent panel, pushed into the insertion groove when the edge section is inserted into the edge section groove. The flexible tongue springs back and into the tongue groove when the panel and the adjacent panel have reached a connected state.

The panel may be a back piece of a bookshelves or a wardrobe and the adjacent panel may be a board of the frame. The panel may also be a bottom panel of a drawer and the adjacent panel a board of the frame. Furthermore the panel and the adjacent panel may be a first and a second board respectively of a frame of a bookshelves, a wardrobe or a drawer. The back piece and the bottom may be a HDF board or a particleboard with a thickness of about 2-4 mm. Embodiments of the disclosure may comprise one or more of the locking devices described above.

FIG. 2A shows a furniture, such as a bookshelves, comprising eight of the locking devices, arranged with a side of the frame facing downwards. The furniture comprises a first panel 1, e.g. a side of the bookshelves, connected at a first edge to a first edge of a second panel 2, e.g. the top of the bookshelves, by one of the locking devices. A first edge of a third panel 4, e.g. a rectangular back piece of the bookshelves, is connected to a second edge of the second panel by another of the locking devices. A second edge of the third panel 4 is connected to second edge of the first panel by another of said locking devices. A first edge of a fourth panel 5, e.g. a bottom of the bookshelves, is connected to a third edge of the first panel by another of said locking devices. An edge section of a third edge of the third panel 4 may be arranged in an edge section groove at a second edge of the fourth panel 5. A first edge of a fifth panel 6, e.g. a side of the bookshelves, is connected to a third edge of the fourth panel 5, by another of said locking devices, and a third edge of the fifth panel is connected to a third edge of the second panel, by another of said locking devices. An edge section of a fourth edge of the third panel 4 may be arranged in an edge section groove at a second edge of the fifth panel 5. The locking device at the first and the second edge respectively of the third panel may each comprise two or more flexible tongues 30. A sixth panel 3, e.g. a shelf of the bookshelves, which is arranged parallel to the first and the fourth panel, is connected, by another of the locking devices, at a first edge to the first to the first panel, and a third edge is connected, by another of the locking devices, to the fifth panel. The flexible tongue of the locking device at the first and third edge, respectively, of the sixth panel is preferably arranged at the edge section 22.

Figure 8A:
FIG. 8A-C show embodiments of a mechanical locking system for a back or a bottom panel according to an embodiment of the disclosure.
Figure 8B:
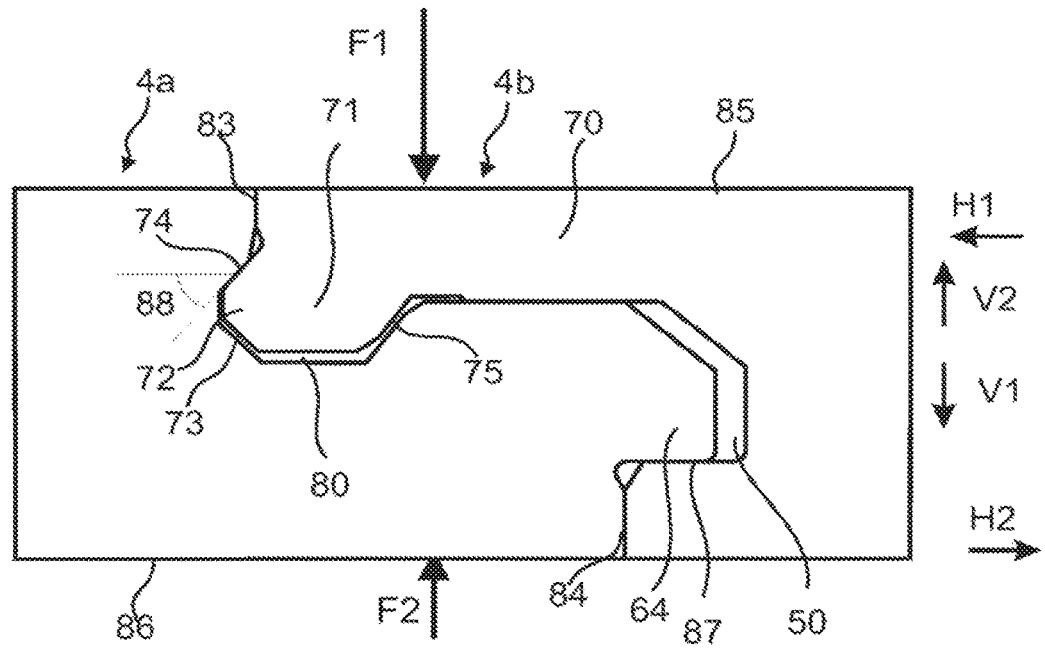
Figure 8C:
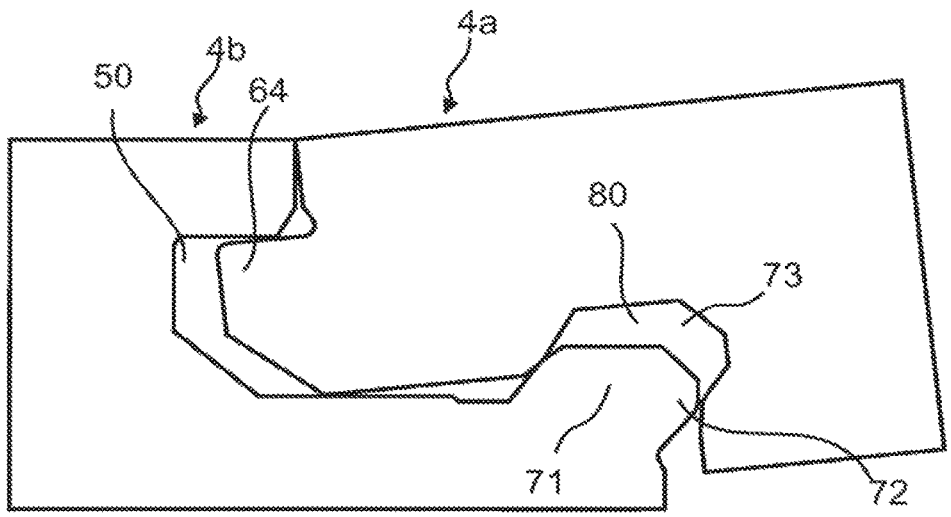

FIG. 2B shows a cross section CS 2B of the first panel 1, the third panel 4 and the fifth panel 6. The figure shows that an edge section of the fourth edge of the third panel may be arranged in edge section groove at the second edge of the fifth panel 6. The third panel 4 may comprise two or more boards 4a-4d locked by a mechanical locking system. Embodiments of the mechanical locking system are shown in FIGS. 8A-C. A second edge of the fifth panel may be provided with another of the locking devices (not shown) for connecting adjacent edges of adjacent boards.

FIG. 2C shows a cross section CS 2C of the second and third panel 2, 4. The third panel is in this embodiment provided with a dismantling groove 33 adapted for insertion of a dismantling tool, which pushes the flexible tongue into the insertion groove, which facilitates dismantling of the second and third panel.

FIG. 3A shows a furniture, such as a bookshelves, comprising eight of the locking devices, arranged with a side of the frame facing downwards. The furniture comprises a first panel 1, e.g. a side of the bookshelves, connected at a first edge to a first edge of a second panel 2, e.g. the top of the bookshelves, by one of the locking devices. A first edge of a third panel 4, e.g. a rectangular back piece of the bookshelves, is connected to a second edge of the second panel by another of the locking devices. An edge section of a second edge of the third panel 4 may be inserted into an edge section groove of a second edge of the first panel. A first edge of a fourth panel 5, e.g. a bottom of the bookshelves, is connected to a third edge of the first panel by another of said locking devices. A third edge of the third panel 4 is connected to a second edge of the fourth panel 5 by another of said locking devices. A first edge of a fifth panel 6, e.g. a side of the bookshelves, is connected to a third edge of the fourth panel 5, by another of said locking devices, and a third edge of the fifth panel is connected to a third edge of the second panel, by another of said locking devices. An edge section of a fourth edge of the third panel 4 may be arranged in an edge section groove at a second edge of the fifth panel 5. The locking device at the first and the third edge respectively of the third panel may each comprise two or more flexible tongues 30. A sixth panel 3, e.g. a shelf of the bookshelves, which is arranged parallel to the first and the fourth panel, is connected, by another of the locking devices, at a first edge to the first to the first panel, and a third edge is connected, by another of the locking devices, to the fifth panel. The flexible tongue of the locking device at the first and third edge, respectively, of the sixth panel is preferably arranged at the edge section 22. The third panel is preferably connected slideable at the first and the third edge in order to facilitate disassembling.

FIG. 3B shows a cross section CS 3B of the first panel 1, the third panel 4 and the fifth panel 6. The third panel 4 may comprise two or more boards 4a-b locked by the mechanical locking system described above.

FIG. 4A shows an embodiment of a method for assembling the assembled product described under FIG. 2A-C. The first, second and sixth panel 1, 2, 3 are preferably connected to each other before the third panel is connected. The third panel may be displaced in a diagonal direction 41 such that the first and the second edge of the third panel is connected at the same time to the second edge of the first panel and to the second edge of the second panel. A preferred alternative for assembling the panels comprises:

arranging a first panel 1, with a first main plane, perpendicular to a second panel 2 with a second main plane, wherein the first main plane is perpendicular to the second main plane;

connecting by hand a first edge of the first panel 1 to a first edge of the second panel, by linearly displacing the first panel and/or the second panel;

arranging a third panel 4, with a third main plane, perpendicular to the second and the third panel, wherein the third main plane is perpendicular to the first and the second main plane;

connecting by hand a second edge of the third panel 4 to a second edge of the second panel, by linearly displacing 43 the third panel 4 and/or second panel;

connecting by hand a first edge of the third panel 4 to a second edge of the first panel 1, by linearly displacing 42 the third panel and/or the first panel 1;

arranging a fourth panel 5, with a fourth main plane, perpendicular to the first and the third panel, wherein the fourth main plane is parallel to the second main plane, and connecting by hand a first edge of a fourth panel 5 to a third edge of the first panel 1, by linearly displacing the fourth panel 5 and/or the first panel 1; and arranging a fifth panel 6, with a fifth main plane, perpendicular to the third and the fourth panel, wherein the fifth main plane is parallel to the first main plane, and connecting by hand a first edge of the fifth panel to a third edge of the second panel, and a third edge of a fifth panel to a third edge of the fourth panel, by linearly displacing the fifth panel 6 and/or the second and the fourth panel.

Each linear displacement is preferably executed in a direction parallel to the third main plane.

The first edge of the third panel 4 is in this alternative connected displaceable at the first edge. Another alternative is to displace the third panel in the second direction 43 perpendicular to the second panel and subsequently displace the third panel in the first direction 43 perpendicular to the first panel. The second edge of the third panel 4 is in this embodiment connected displaceable at the second edge.

Figure 4B:
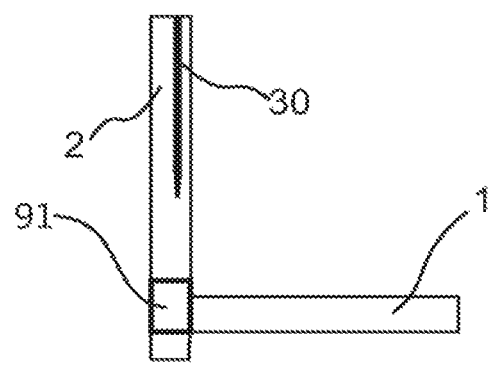
FIG. 4B shows a corner section of a furniture component or a furniture according to an embodiment of the disclosure.

FIG. 4B shows that a corner section between e.g. the first and the second panel may be provided with a cover plate, in order to hide the locking device.

FIG. 5 shows a furniture, such as a drawer, comprising six of the locking devices, arranged with a side of the frame facing downwards. The furniture comprises a first panel 1, e.g. an inner side of the drawer, connected at a first edge to a first edge of a second panel 2, e.g. a side of the drawer, by one of the locking devices. A first edge of a third panel 4, e.g. a rectangular bottom of the drawer, is connected to a second edge of the second panel by another of the locking devices. An edge section of a second edge of the third panel 4 may be inserted into an edge section groove of a second edge of the first panel. A first edge of a fourth panel 5, e.g. a side of the drawer, is connected to a third edge of the first panel by another of said locking devices. A third edge of the third panel 4 is connected to a second edge of the fourth panel 5 by another of said locking devices. A first edge of a fifth panel 6, e.g. a front panel of the drawer, is subsequently connected to a third edge of the fourth panel 5, by another of said locking devices, and a third edge of the fifth panel is connected to a third edge of the second panel, by another of said locking devices. An edge section of a fourth edge of the third panel 4 may be arranged in an edge section groove at a second edge of the fifth panel 5. The locking device at the first and the third edge respectively of the third panel may each comprise two or more flexible tongues 30. The third panel is preferably connected slideable at the first and the third edge in order to facilitate disassembling. A preferred alternative for assembling the panels comprises:

arranging a first panel 1, with a first main plane, perpendicular to a second panel 2 with a second main plane, wherein the first main plane is perpendicular to the second main plane;

connecting by hand a first edge of the first panel 1 to a first edge of the second panel, by linearly displacing the first panel and/or the second panel;

arranging a third panel 4, with a third main plane, perpendicular to the second and the third panel, wherein the third main plane is perpendicular to the first and the second main plane;

connecting by hand a second edge of the third panel 4 to a second edge of the second panel, by linearly displacing 43 the third panel 4 and/or second panel;

arranging a fourth panel 5, with a fourth main plane, perpendicular to the first and the third panel, wherein the fourth main plane is parallel to the second main plane, and simultaneous connecting by hand, by linearly displacing the fourth panel 5, a first edge of a fourth panel 5 to a third edge of the first panel 1 and a third edge of the third panel 3 to a second edge of the fourth panel 5; and arranging a fifth panel 6, with a fifth main plane, perpendicular to the third and the fourth panel, wherein the fifth main plane is parallel to the first main plane, and connecting by hand a first edge of the fifth panel to a third edge of the second panel, and a third edge of a fifth panel to a third edge of the fourth panel, by linearly displacing 44 the fifth panel 6.

FIGS. 6A-B show alternative embodiments of the locking device. Embodiments are shown with a calibrating groove 40 at one or two sides of the edge section. The tongue groove 10 may be symmetric such that the same dismantling tool can be used at opposite positions of the locking device, i.e. mirror inverted locking devices. The edge section groove may be provided with a guiding surface 32 that facilitates insertion of the edge section into the edge section groove. The edge section groove may be provided with two opposite tongue grooves 10. Two opposite tongue grooves may be easily made by an end cutter, by e.g. a craftsman on site.

FIG. 7A shows that the embodiment with two opposite tongue grooves 10 may be provided with two flexible tongues 30.

FIG. 7B-C show disassembling of the locking device by inserting a symmetric dismantling tool 90 into a symmetric tongue groove 10.

FIG. 7D-E show alternative embodiments provided with a dismantling recess 34. These embodiments may be an alternative to the embodiment shown in FIG. 2C, if for example it is desired to un-lock the locking device from the inside of a furniture, such as a drawer, a box or a book. These embodiments may also be used to connect the fifth panel to the second and fourth panel in the embodiment shown in FIG. SA. The tongue 30 is arranged in the edges section groove in FIG. 7B and at the edge section in FIG. 7E. The edge section is provided with a dismantling groove 34 which adapted to a dismantling tool 90. The tongue 30 is pushed back into the displacement groove 20, and un-lock the locking device, when the dismantling tool is inserted into the dismantling recess. The dismantling recess may be covered by a covering plate (not shown). The embodiments with the dismantling groove or recess are particular advantageous for embodiment which do not have tongue groove which is accessible from an outer end of the tongue groove for insertion of a dismantling tool. However, the embodiments with the dismantling groove or recess may be used to connect any adjacent panels in order to facilitate disassembling.

FIG. 8A shows an embodiment of the mechanical locking system comprising a tongue 64 at a first edge of a first board that cooperates with a tongue groove 50 at a second edge of a second board for locking the first and the second board in a first direction. Furthermore, the locking system comprises a protruding strip 70 with a locking panel 71 at the second edge. The locking panel 71 cooperates with a locking groove 80 at the first edge for locking the first and the second board in a second direction, which is perpendicular to the first direction. The boards and the locking system is preferably arranged in the assembled product, with the locking strip facing the direction that is to be loaded. The locking system may remain locked if arranged in this way.

FIG. 8B shows another embodiment of a panel, such as a back or bottom panel, comprising a first 8a and a second board 8b provided with a mechanical locking system configured to lock the first 4a and the second board 4b together.

The first main plane of the first board is essentially parallel to a second main plane of the second board, wherein the panel comprises a first face 85 and an opposite second face 86 which are parallel to a main plane of the panel, the mechanical locking system comprising:

a first tongue 64 provided at a first edge of the first board 8a, wherein the first tongue is configured to cooperate with a first tongue groove 50 provided at a second edge of the second board 8b for locking together the first and the second panel in a first vertical direction V1;

a second tongue 72 at the second edge of the second board 8b, wherein the second tongue is configured to cooperate with a second tongue groove 73 at the first edge of the first panel 8a for locking together the first and the second panel in a second vertical direction V2;

a first pair of locking surfaces 83 provided at the first face for locking together the first board 8a and the second board 8b in a first horizontal direction HI; and second pair of locking surfaces 84 provided at the second face for locking together the first board 8a and the second board (8b in a second horizontal direction (H2).

The first pair of locking surfaces (83) are preferably essentially vertical. The second pair of locking surfaces 84 are also preferably essentially vertical.

The first tongue 64 and the first tongue groove 50 cooperate at a third pair of locking surfaces 87 that are preferably arranged essentially horizontally.

The second tongue 72 and the second tongue groove 73 cooperate at a fourth pair of locking surfaces 74 that are preferably arranged at an angle 88 to the main plane of the panel that is greater than zero. The angle 88 is elected to allow the first board to be locked to the second board by an angling motion of the first panel, wherein the first tongue 64 is inserted in the first tongue groove 50, as is shown in FIG. 8C.

The first face 85 is arranged upwards, or in the direction were the greatest load F1 is likely to be applied, to prevent that the first and the second board are unlocked by a reversed angling motion.

The second face 86 is arranged downwards, or in the direction were the smallest load F2 is likely to be applied on the panel. The second tongue and the tongue groove may provide a resistance for unlocking of the first and the second board by a reversed angling motion.

The angle 88 may be in the range of about 30° to about 60°. The angle is preferably about 45°.

FIG. 9 shows a preferred embodiment of the locking device for locking together a panel and an adjacent panel of the frame panels 1, 2, 4, 5. The locking device comprises a first thickness 55 of a core material, between an edge section groove 21 and a first edge. The first thickness is greater than a minimum second thickness 54 of a core material of an edge section 22. The ratio between the first thickness 55 and the minimum second thickness 54 may be at least about 1.25; preferably at least about 1.5; and more preferably at least about 2. A preferred ratio between the first thickness 55 and the minimum second thickness 54 is in the range of about 1.1 to about 3.

An embodiment comprises an edge section groove 21 that comprises a first wall 56 and a second wall 57, wherein the first wall is closer to the an edge of the panel than the second wall. The first thickness 55 is preferably measured between the first wall 56 and the first edge 53. The first and the second walls 56, 57 are preferably connected by a bottom wall 58.

The edge section 22 may comprise a first wall and an opposite second wall, wherein the tongue groove 10 is provided in the first wall. The minimum second thickness 54 may be measured between a bottom of the tongue groove and the second wall.

An embodiment of the insertion groove 20 that extends along essentially the entire length of the edge section groove of first edge may lead to an easier production. An embodiment of the tongue groove 10 that extends along essentially the entire length of the edge section of the second edge may also lead to an easier production.

The edge 53 of the panel 2 is in a preferred embodiment provided essentially in the same plane as an outer face 63 of the adjacent second panel 4.

An edge of the opening of the edge section groove may be provided with a bevel 59 or rounding in order to facilitate the insertion of a flexible tongue 30 into the insertion groove 20.

Figure 10A:
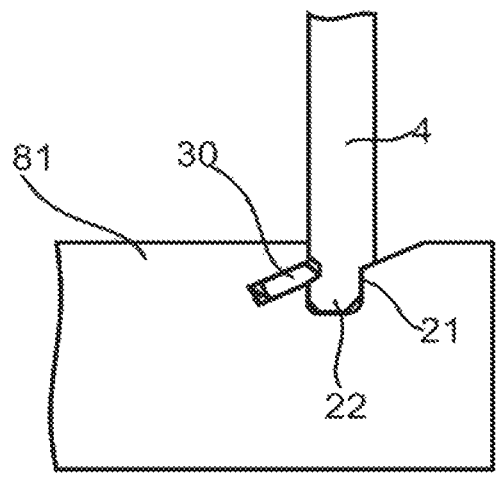
FIG. 10A shows a locking device for locking a back or a bottom panel to a frame according to an embodiment of the disclosure.

FIG. 10A shows an embodiment of a locking device for locking the third panel 4, such as a back piece or a bottom panel, to any back or bottom edge 81 of the frame. An embodiment of the frame is shown in FIGS. 2A, 3A and 5.

Figure 10B:
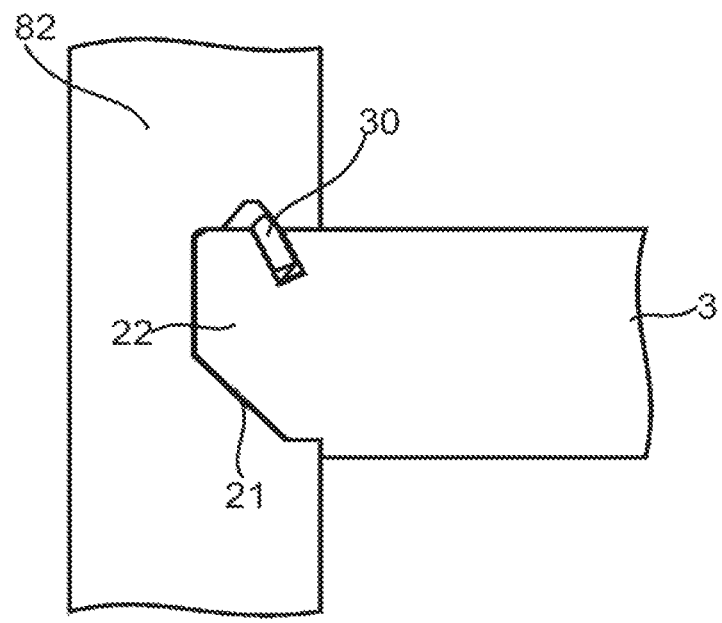
FIG. 10B shows a locking device for locking a shelf to a frame according to an embodiment of the disclosure.

FIG. 10B shows an embodiment of a locking device for locking the sixth panel 3, such as a shelf, to any panel 82 of the frame. A first edge of the sixth panel may be connected to the frame by linearly displacement and/or an angling motion. An embodiment of the frame is shown in FIG. 2A and FIG. 3A.

Figure 11A:
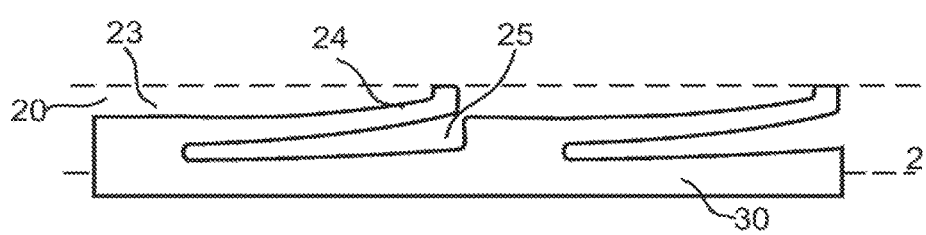
FIG. 11A-H show flexible tongues according to embodiments of the disclosure.
Figure 11B:
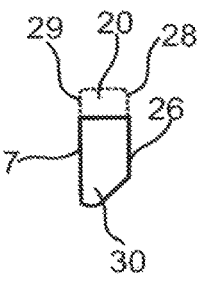
Figure 11C:
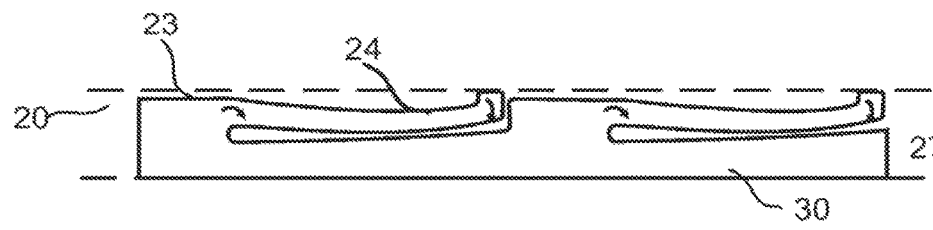
Figure 11D:
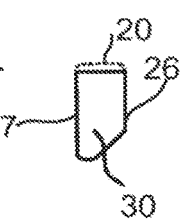

An embodiment of the flexible tongue 30, which is displaceable in an insertion groove 20, is shown in FIGS. 11A-11D. FIGS. 11A-B show the flexible tongue in a locked potion and FIGS. 11C-D show the flexible tongue during assembling of the a panel and an adjacent panel. FIG. 11B shows a cross section of the flexible tongue in FIG. 11A. FIG. 11D shows a cross section of the flexile tongue in FIG. 11C. The flexible tongue comprises bendable protruding parts 24. A space 23 is provided between the tongue and a bottom wall of the insertion groove 20. FIG. 11C shows that the flexible tongue is pushed into the insertion groove 20 and towards the bottom wall during the assembling of the panel. The tongue springs back when the first and the second panel have reached a locked position. A recess 25 is preferably arranged at each bendable protruding part.

The flexible tongue may have a first displacement surface 26 and a opposite second displacement surface 27, configured to be displaced along a third and a fourth 20 displacement surface 28, 29, respectively, of the insertion groove 20.

Figure 11E:
Figure 11F:
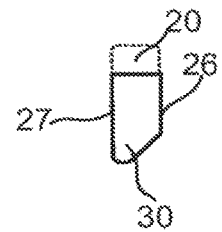

An alternative embodiment of the flexible tongue 30, without the protruding bendable parts, is shown in FIG. 11E-F. FIG. 11F shows a cross section of the tongue in FIG. 11E. The alternative embodiment is bendable in its length direction in order to accomplish the same function as the embodiment shown in FIG. 11A-D.

Figure 11G:
Figure 11H:
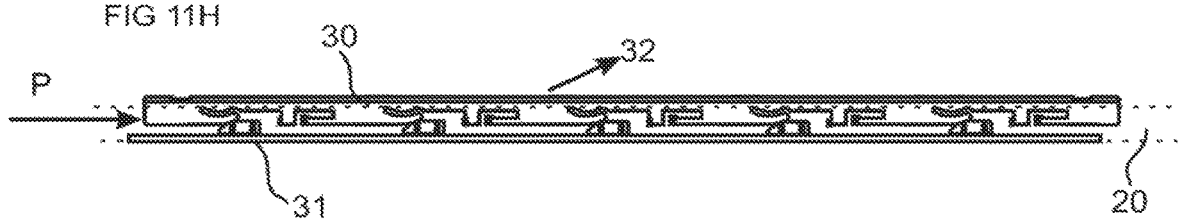

A further embodiment of the flexible tongue 30 is shown in FIG. 11G-H. FIG. 11G shows the flexible tongue 30 before the panel and the adjacent panel are locked together by the flexible tongue. The flexible tongue comprises an inner part 31 provided with wedge elements and an outer part for the locking together the panel and the adjacent panel by the flexible tongue. The locking is obtained by applying a force P, in a direction parallel to the first edge, at a short edge of the outer part. The force displaces the outer tongue part in the direction parallel to the edge of the panel and the wedges force the outer tongue part in a perpendicular direction, out of the insertion groove 20. The resulting displacement 32 of the outer part of the flexible tongue is therefore in a direction between the direction parallel to the first edge and the perpendicular direction.

While illustrative embodiments of the invention have been described herein, the present invention is not limited to the various preferred embodiments described herein but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to the examples described in the present specification or during prosecution of the application, which examples are to be construed as non-15 exclusive.

The invention claimed is:

1. A set of panels for an assembled product, wherein the set of panels is provided with one or more locking devices, each locking device comprises a flexible tongue arranged in an insertion groove at an edge of a panel, said flexible tongue cooperates with a tongue groove at an adjacent edge of an adjacent panel, for locking the panel and the adjacent panel together, wherein the locking device is configured such that the edge and the adjacent edge may be connected by hand, the set of panels comprises at least four frame panels that are configured to be connected together at adjacent edges by at least one of said locking devices to obtain a frame having at least four walls that form a rectangle or a square around a perimeter of the frame, wherein the frame comprising a back edge and a bottom edge, where the back edge and the bottom edge each comprise at least one of the locking devices, wherein the set of panels comprises a fifth panel, which is configured to be connected to each of the one or more locking devices at the back edge and the bottom edge, respectively, of the frame.

2. The assembled product as claimed in claim 1, wherein the panels are wood fibre based boards.

3. The assembled product as claimed in claim 2, wherein the panels are HDF boards, particleboard or solid wood board.

4. The assembled product as claimed in claim 3, wherein the panels comprise a decorative layer.

5. The assembled product as claimed in claim 2, wherein the assembled product is a furniture component or a furniture.

6. The assembled product as claimed in claim 1, wherein fifth panel is a back piece which increases the strength of the assembled product.

7. The set of panels as claimed in claim 1, wherein each of the locking devices comprises an edge section groove at the panel or at the adjacent panel, wherein an edge section of the other of the panel or the adjacent panel cooperate with said edge groove for locking the panel and the adjacent panel together, wherein the flexible tongue and the tongue groove cooperate for locking the panel and the adjacent panel together in a first direction and the edge section and the edge section groove cooperate for locking the panel and the adjacent panel together in a second direction, perpendicular to the first direction.

8. The set of panels as claimed in claim 7, wherein the edge section is provided with a calibrating groove.

9. The set of panels as claimed in claim 1, wherein the assembled product is a furniture component or a furniture product.

10. The set of panels as claimed in claim 1, wherein the insertion groove, of at least one of said locking devices, extends along essentially the entire length of the edge of the panel.

11. The set of panels as claimed in claim 1, wherein the tongue groove, at the adjacent edge of the adjacent panel, extends along essentially the entire length of the adjacent edge of the adjacent panel.

12. The set of panels as claimed in claim 1, wherein the flexible tongue is configured to be displaceable in the insertion groove.

\* \* \* \* \*